United States Patent
Hwang et al.

(10) Patent No.: US 12,527,652 B2
(45) Date of Patent: Jan. 20, 2026

(54) ARTIFICIAL TOOTH MANUFACTURING INFORMATION GENERATION METHOD AND ARTIFICIAL TOOTH MANUFACTURING SYSTEM

(71) Applicant: IUCF-HYU (INDUSTRY-UNIVERSITY COOPERATION FOUNDATION HANYANG UNIVERSITY), Seoul (KR)

(72) Inventors: Kyung Gyun Hwang, Seoul (KR); Hyung Tek Lim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 536 days.

(21) Appl. No.: 18/079,471

(22) Filed: Dec. 12, 2022

(65) Prior Publication Data
US 2023/0107480 A1    Apr. 6, 2023

Related U.S. Application Data

(63) Continuation of application No. PCT/KR2021/004634, filed on Apr. 13, 2021.

(30) Foreign Application Priority Data

Jun. 22, 2020   (KR) .................. 10-2020-0075765

(51) Int. Cl.
G06T 7/90    (2017.01)
A61C 9/00    (2006.01)
(Continued)

(52) U.S. Cl.
CPC ........ *A61C 13/0004* (2013.01); *A61C 9/0053* (2013.01); *G06N 3/0464* (2023.01);
(Continued)

(58) Field of Classification Search
CPC ... A61C 13/0004; A61C 9/0053; A61C 19/04; A61C 13/0019; A61C 5/77; A61C 19/10;
(Continued)

(56) References Cited

U.S. PATENT DOCUMENTS

2008/0062429 A1*  3/2008  Liang ............... A61B 1/043
                                                      356/497
2009/0168063 A1*  7/2009  Kobayashi .......... G01J 3/02
                                                      356/404
(Continued)

FOREIGN PATENT DOCUMENTS

CN      101365397 B  *  4/2012  ............ A61B 1/063
JP      2002-189164 A     7/2002
(Continued)

OTHER PUBLICATIONS

Seong-Taek Lee et al., "Individual Tooth Image Segmentation with Correcting of Specular Reflections", Transactions of the Korean Institute of Electrical Engineers, Jun. 2010, pp. 1136-1142, vol. 9, No. 6.
(Continued)

*Primary Examiner* — Jose L Couso
(74) *Attorney, Agent, or Firm* — Sughrue Mion, PLLC

(57) ABSTRACT

An artificial tooth manufacturing information generation method is provided. The artificial tooth manufacturing information generation method may include the steps of: photographing a target tooth to acquire a primary image; correcting the primary image to acquire a secondary image; selecting an area including the target tooth from the secondary image to extract a tertiary image; selecting a noise
(Continued)

area caused by reflected light from the tertiary image and then correcting the noise area, to acquire a quaternary image; and generating artificial tooth manufacturing information by using a pixel value of the target tooth included in the quaternary image.

10 Claims, 23 Drawing Sheets

(51) Int. Cl.
*A61C 13/00* (2006.01)
*G06N 3/0464* (2023.01)
*G06T 5/70* (2024.01)
*G06T 7/00* (2017.01)

(52) U.S. Cl.
CPC .............. *G06T 5/70* (2024.01); *G06T 7/0014* (2013.01); *G06T 7/90* (2017.01); *G06T 2207/10024* (2013.01); *G06T 2207/20084* (2013.01); *G06T 2207/30036* (2013.01)

(58) Field of Classification Search
CPC .... A61C 13/083; A61C 13/09; G06N 3/0464; G06N 3/02; G06N 3/08–088; G06N 3/0445; G06N 3/0454; G06N 3/4046; G06N 3/4053; G06N 7/00; G06N 7/01; G06N 20/00; G06T 5/70; G06T 7/0014; G06T 7/90; G06T 2207/10024; G06T 2207/20084; G06T 2207/30036; G06T 5/50; G06T 2207/20221; G06T 15/08; G06T 17/00; G06T 2207/30004; G06T 2210/41; G06T 7/0012; G06T 3/4046; G06T 5/60; G06T 9/002; G06T 2207/20076; G06T 2207/20081; G01J 3/50; G01J 3/52; G01J 3/508; A61B 5/0088; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06F 18/214; G06F 18/22; G06F 18/241; G06F 18/24; G06F 18/2411; G06F 18/2415; G06F 30/27; Y10S 128/925

See application file for complete search history.

(56) References Cited

U.S. PATENT DOCUMENTS

| | | | |
|---|---|---|---|
| 2011/0102578 A1* | 5/2011 | Kaminaga | H04N 23/741 348/135 |
| 2013/0244197 A1* | 9/2013 | Tjioe | G01J 3/508 433/29 |
| 2014/0272762 A1* | 9/2014 | Weisz | A61C 19/10 433/203.1 |
| 2020/0375469 A1* | 12/2020 | Kilpatrick-Liverman | A61B 5/0088 |

FOREIGN PATENT DOCUMENTS

| | | | | |
|---|---|---|---|---|
| JP | 2004-520142 A | | 7/2004 | |
| JP | 2007-319175 A | | 12/2007 | |
| JP | 2010279695 A | * | 12/2010 | ......... A61B 1/00009 |
| JP | 2011-095073 A | | 5/2011 | |
| KR | 10-2008-0077209 A | | 8/2008 | |
| KR | 10-2010-0002798 A | | 1/2010 | |
| KR | 10-1385743 B1 | | 4/2014 | |
| KR | 10-1814511 B1 | | 1/2018 | |
| KR | 101854729 B1 | * | 5/2018 | ......... A61C 13/0006 |
| KR | 10-2019-0022941 A | | 3/2019 | |
| KR | 10-2019-009496 A | | 8/2019 | |
| KR | 10-2024988 B1 | | 9/2019 | |
| KR | 10-2020-0023225 A | | 3/2020 | |
| WO | WO-2012096312 A1 | * | 7/2012 | ............... A61B 1/04 |
| WO | WO-2013008097 A1 | * | 1/2013 | ............... A61B 1/24 |
| WO | WO-2017166326 A1 | * | 10/2017 | ........... A61C 13/082 |
| WO | WO-2019244254 A1 | * | 12/2019 | ............. A61C 19/04 |

OTHER PUBLICATIONS

International Search Report for PCT/KR/2021/004634, dated Oct. 7, 2021.

* cited by examiner

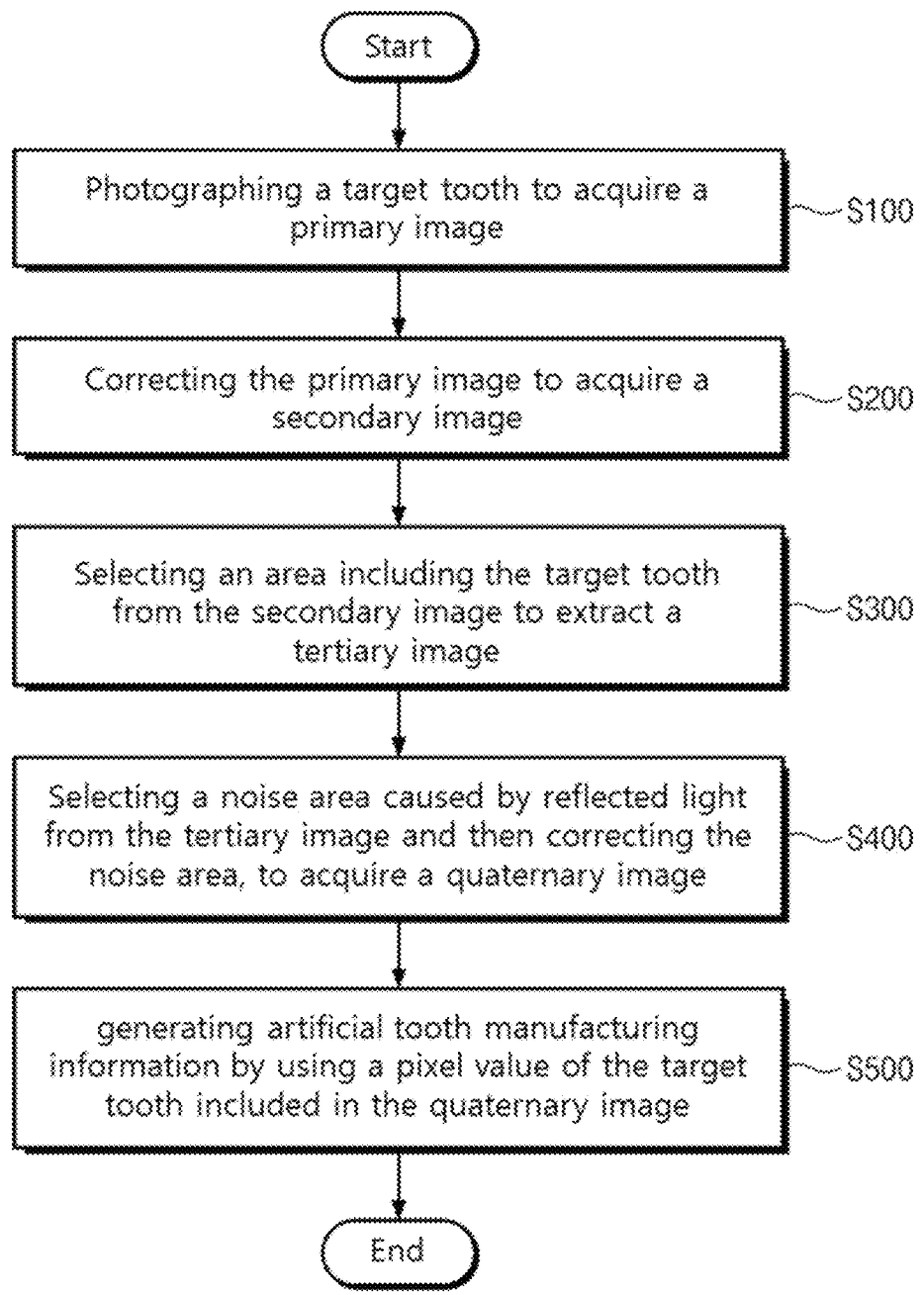
[Fig. 1]

[Fig. 2]
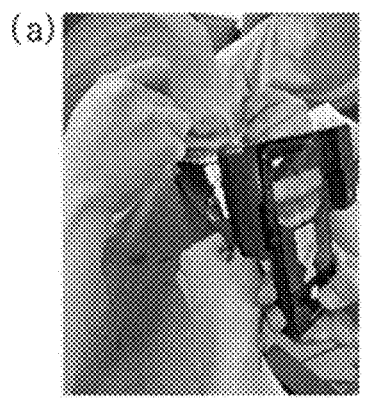
(a)
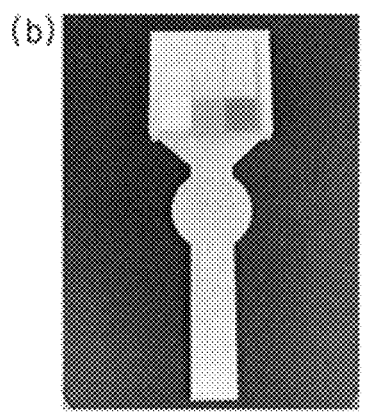
(b)
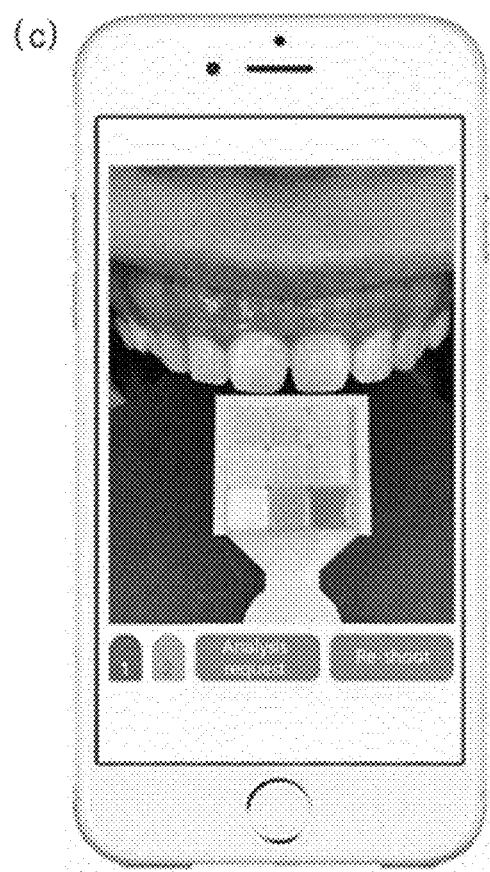
(c)

[Fig. 3]
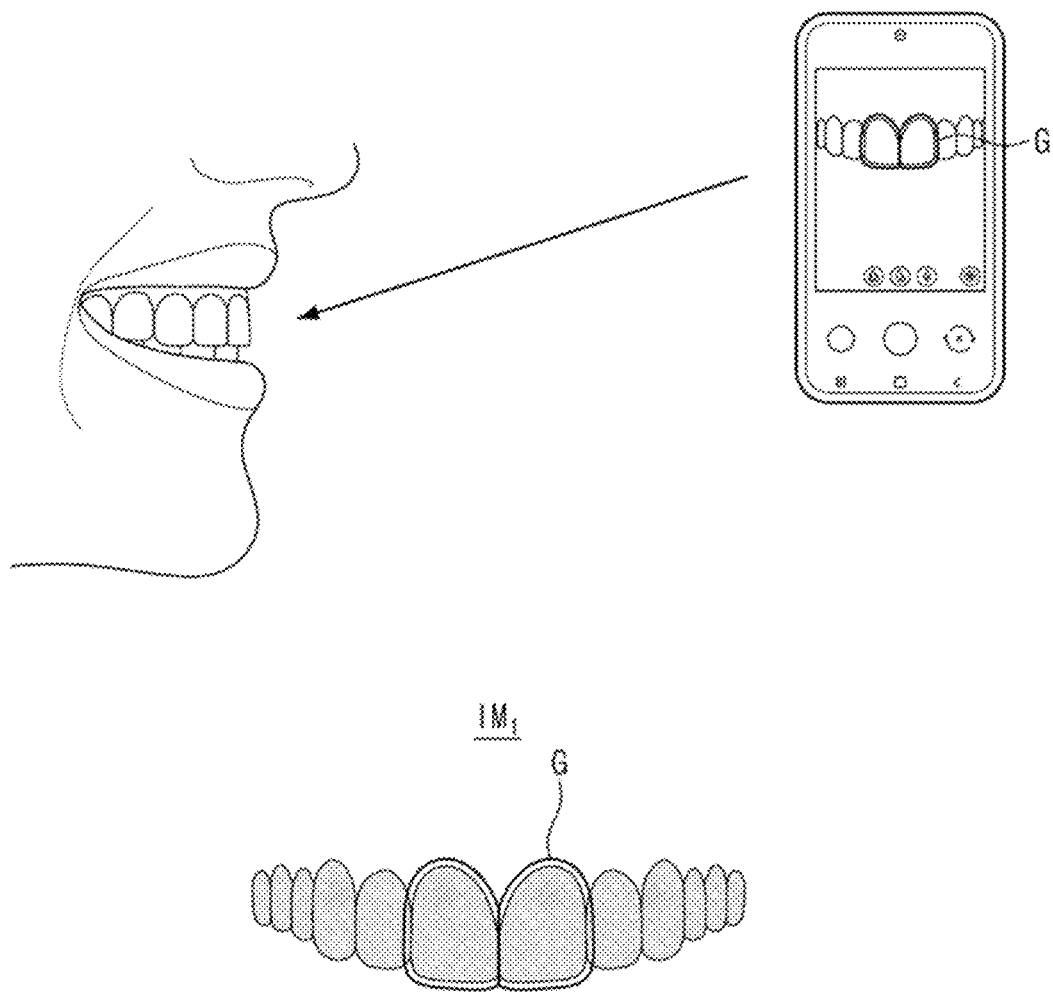

[Fig. 4]
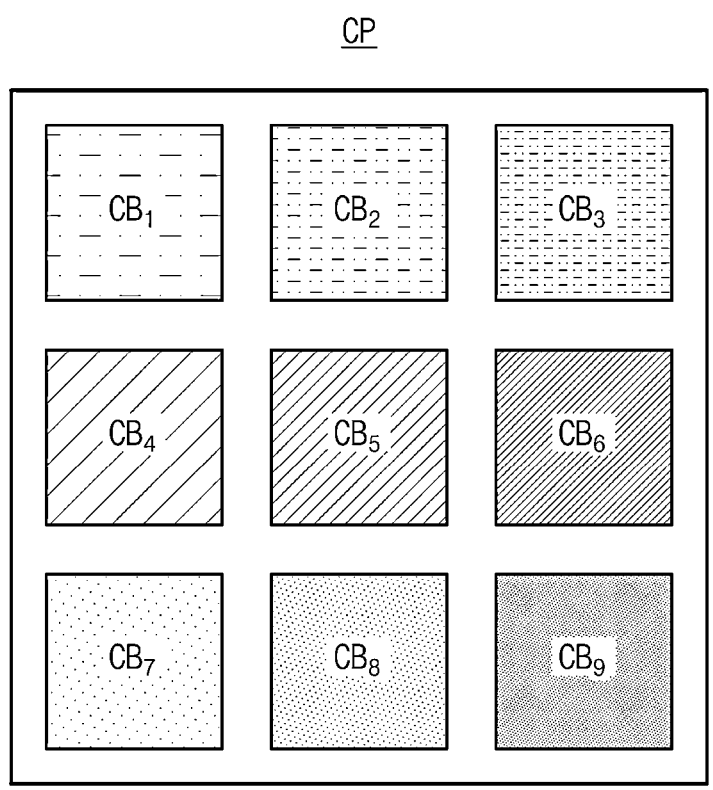

[Fig. 5]
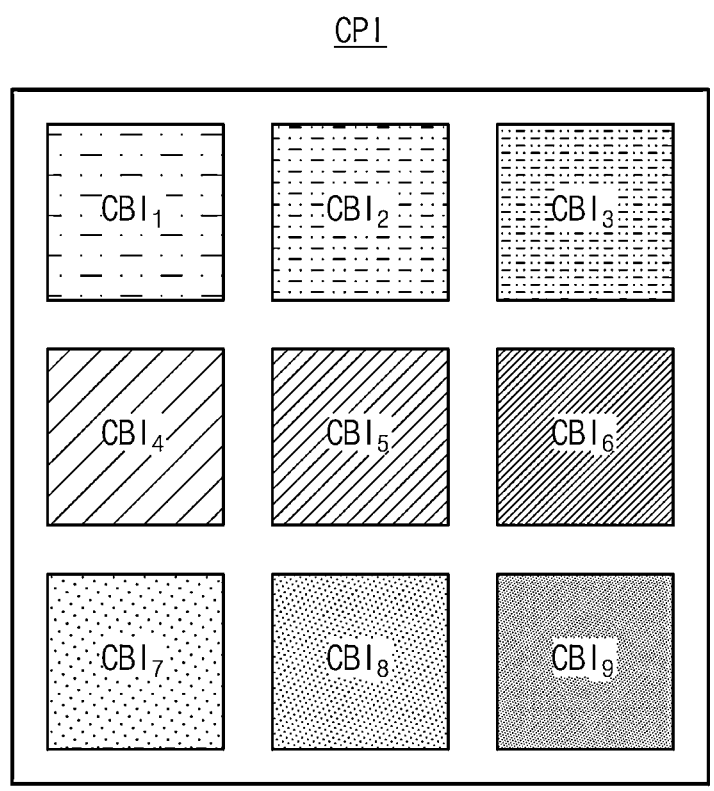

[Fig. 6]
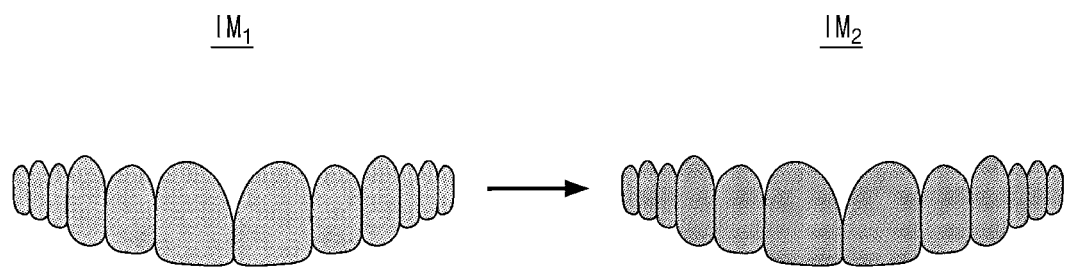
[Fig. 7]
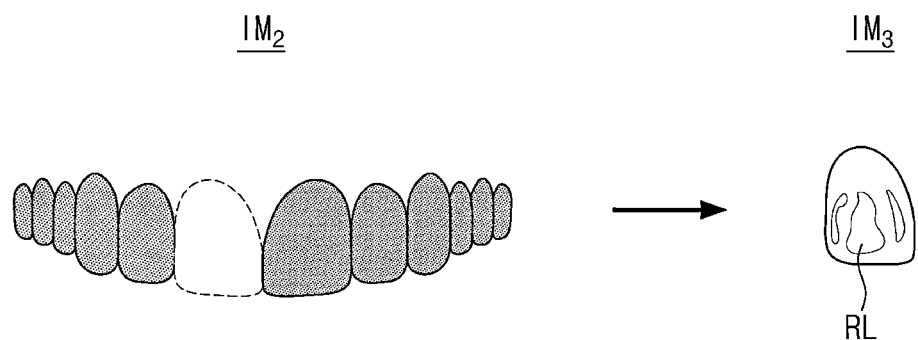

[Fig. 8]
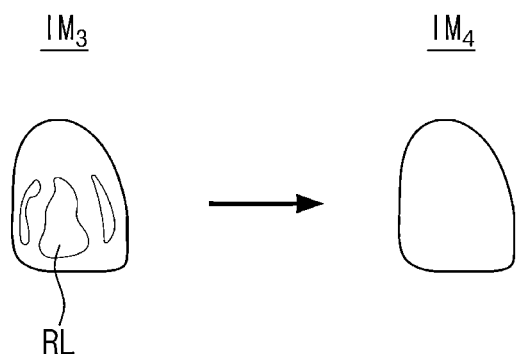
[Fig. 9]
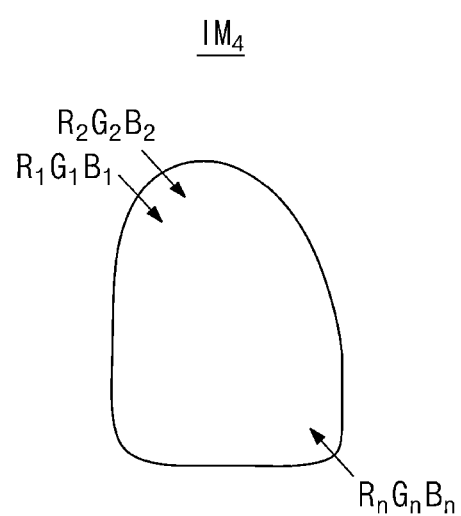

[Fig. 10]

| Pixel value | Mixing ratio | | | | | | | | |
|---|---|---|---|---|---|---|---|---|---|
| | $CB_1$ | $CB_2$ | $CB_3$ | $CB_4$ | $CB_5$ | $CB_6$ | $CB_7$ | $CB_8$ | $CB_9$ |
| $R_1G_1B_1$ | 10% | 8% | 3% | 12% | 2% | 20% | 15% | 17% | 13% |
| $R_2G_2B_2$ | 8% | 12% | 10% | 3% | 17% | 13% | 2% | 20% | 15% |
| ⋮ | | | | ⋮ | | | | | |
| $R_nG_nB_n$ | 15% | 17% | 13% | 10% | 8% | 3% | 12% | 2% | 20% |

[Fig. 11]
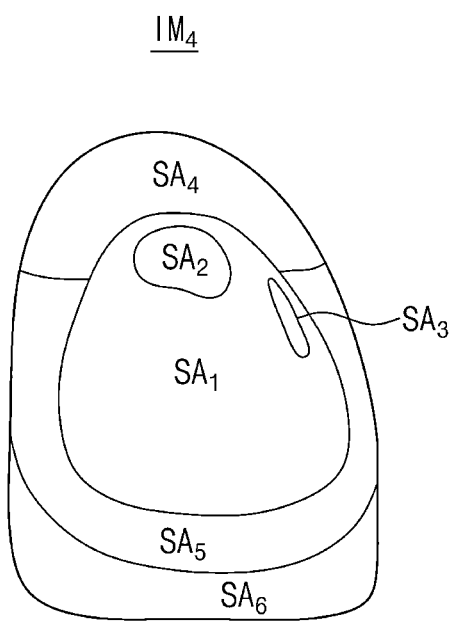

[Fig. 12]
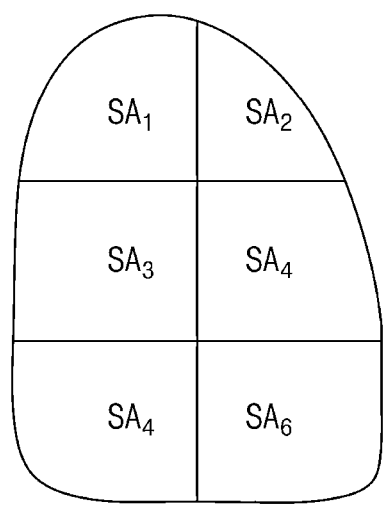

[Fig. 13]

| Sub-area | Mixing ratio | | | | | | | | |
|---|---|---|---|---|---|---|---|---|---|
| | $CB_1$ | $CB_2$ | $CB_3$ | $CB_4$ | $CB_5$ | $CB_6$ | $CB_7$ | $CB_8$ | $CB_9$ |
| $SA_1$ | 15% | 17% | 13% | 10% | 8% | 3% | 12% | 2% | 20% |
| $SA_2$ | 13% | 10% | 8% | 3% | 12% | 2% | 15% | 20% | 17% |
| $SA_3$ | 20% | 2% | 12% | 3% | 8% | 10% | 13% | 17% | 15% |
| $SA_4$ | 8% | 3% | 12% | 2% | 20% | 15% | 17% | 13% | 10% |
| $SA_5$ | 10% | 13% | 17% | 15% | 20% | 3% | 2% | 12% | 8% |
| $SA_6$ | 3% | 12% | 2% | 13% | 10% | 8% | 17% | 15% | 20% |

[Fig. 14]
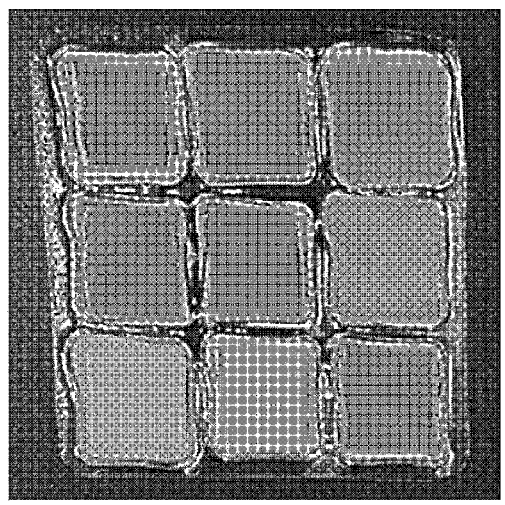

[Fig. 15]
(a) 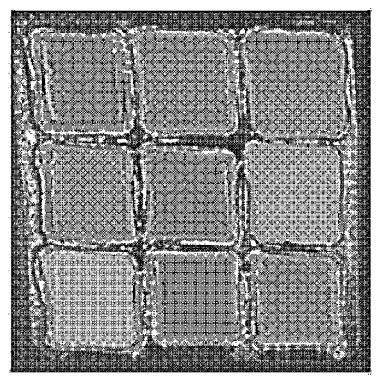
(b) 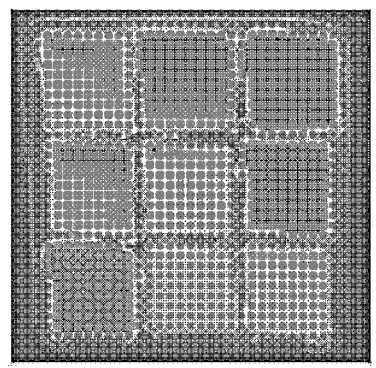

[Fig. 16]
(a) 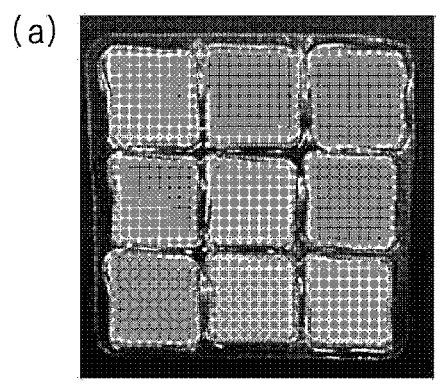
(b) 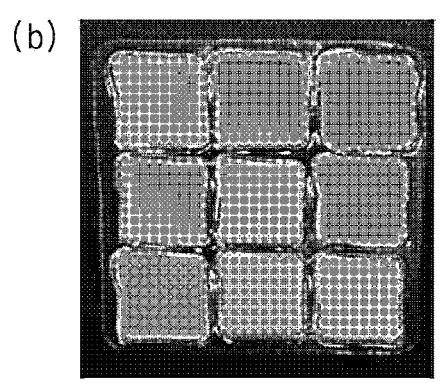

[Fig. 17]
(a) 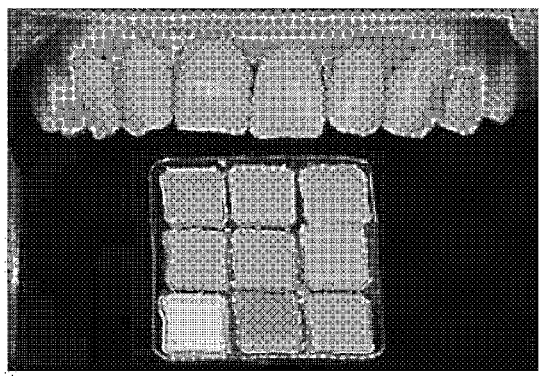
(b) 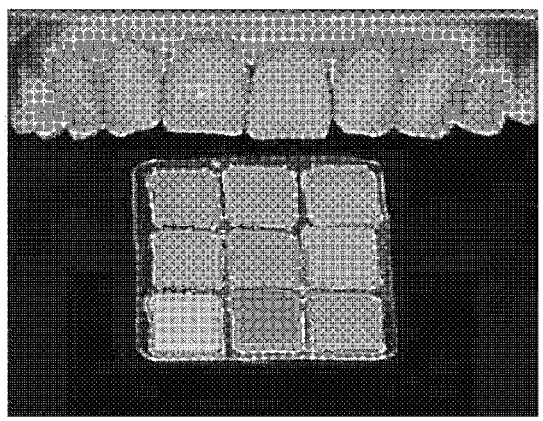

[Fig. 18]
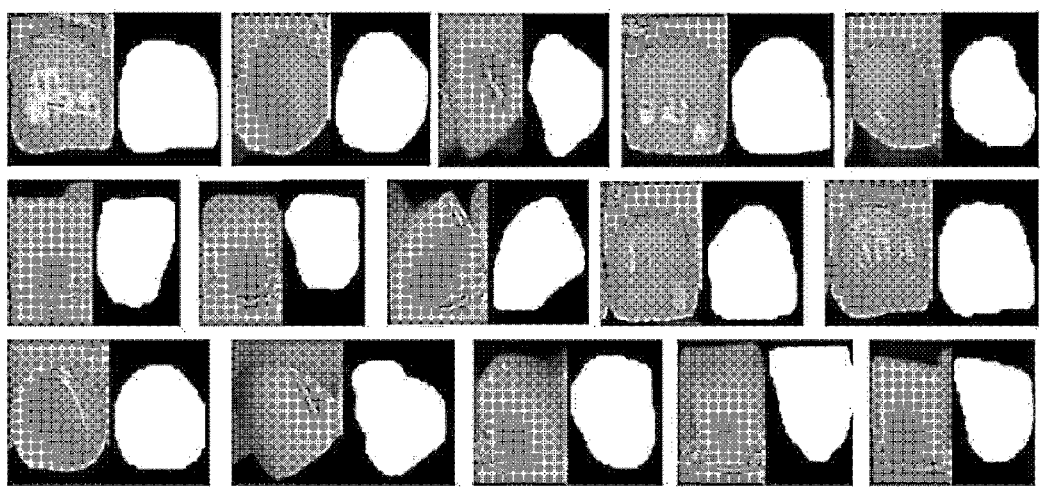

[Fig. 19]
(a)
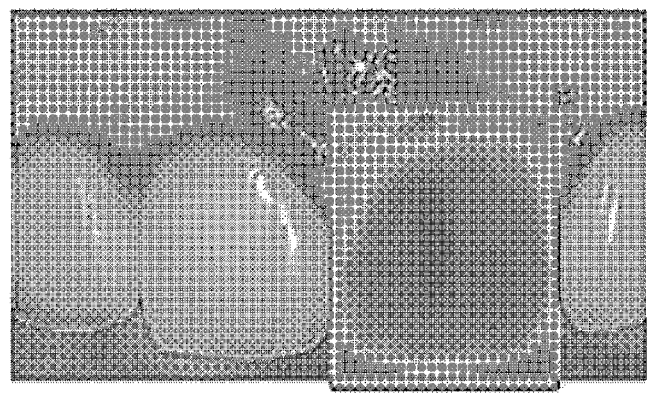
(b)
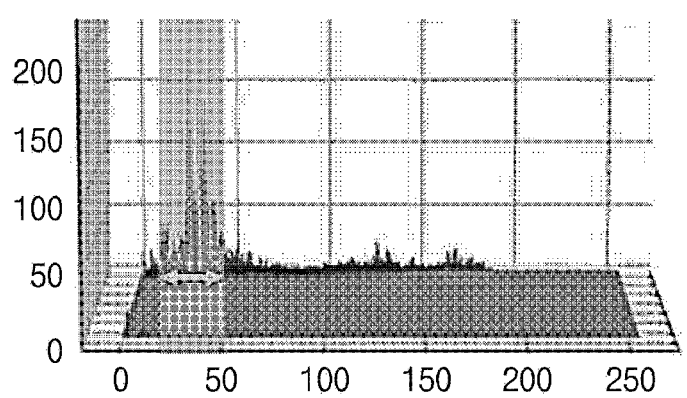

[Fig. 20]
(a)
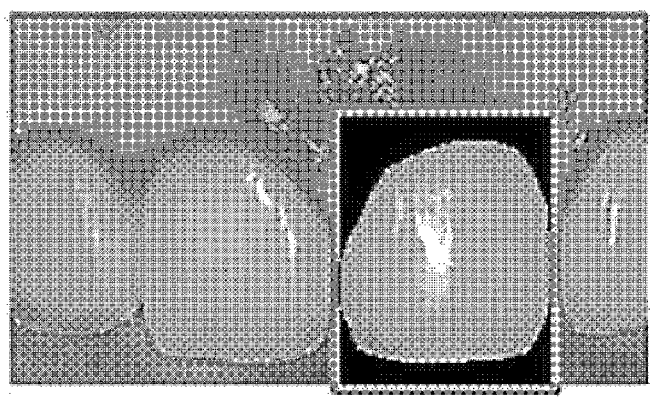
(b)
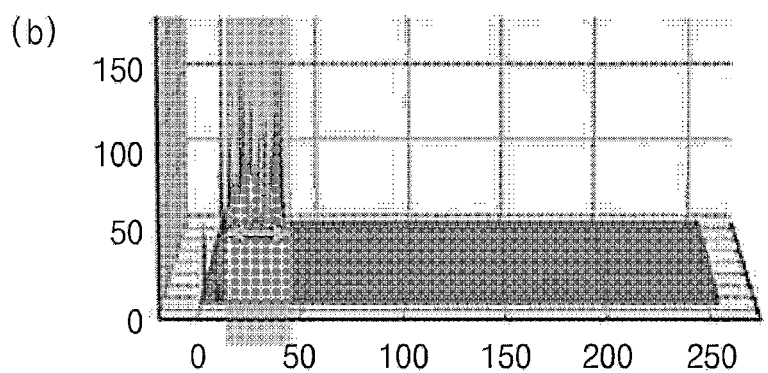

[Fig. 21]
(a)
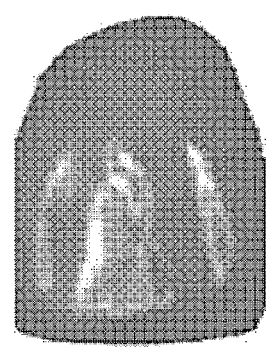
(b)
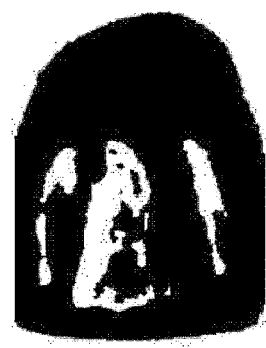

[Fig. 22]
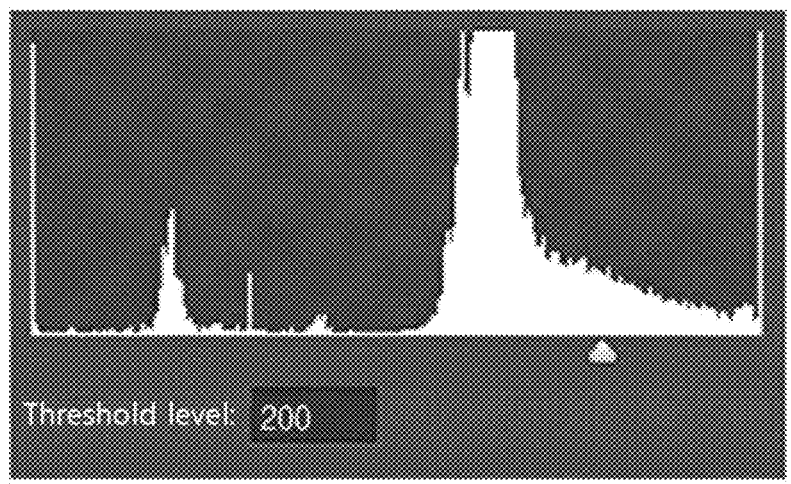

[Fig. 23]
(a) 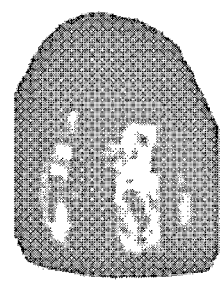
(b) 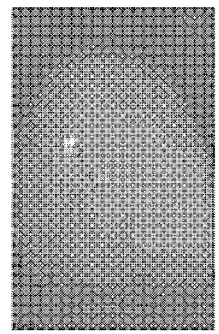

[Fig. 24]
(a) 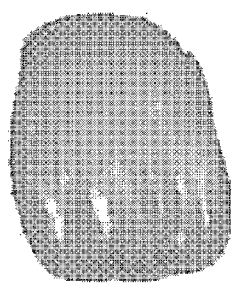
(b) 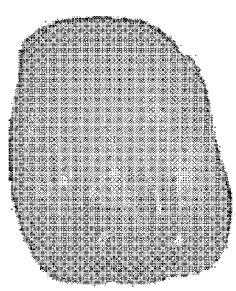

[Fig. 25]
(a) 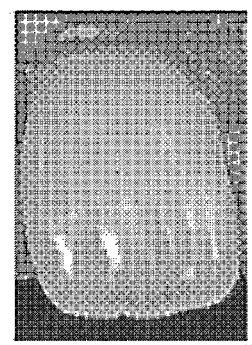
(b) 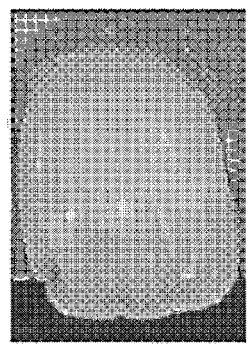

ARTIFICIAL TOOTH MANUFACTURING INFORMATION GENERATION METHOD AND ARTIFICIAL TOOTH MANUFACTURING SYSTEM

TECHNICAL FIELD

The present invention relates to an artificial tooth manufacturing information generation method and an artificial tooth manufacturing system, and more particularly, to an artificial tooth manufacturing information generation method and an artificial tooth manufacturing system to photograph a target tooth and then correct the photographed image.

BACKGROUND ART

In general, a normal person has 16 teeth in the upper jaw and 16 teeth in the lower jaw, and performs oral activities throughout the life by using growth teeth after baby teeth created in infancy are replaced with the growth teeth as entering the growing phase. However, the growth teeth may be damaged or lost due to various oral diseases, for example, tooth decay or gum disease. As a method for restoring or treating the damaged teeth, dentures through prosthetics are applied to replace the damaged teeth.

However, when the dental prostheses are manufactured in a dental clinic, the color mismatch may often cause discomfort to patients. Accordingly, various methods for supplementing the above problem are being researched and developed. For example, Korean Unexamined Patent Publication No. 10-2007-0080120 (Application No.: 10-2006-0011252. Applicant: Cho, Gyeong-yeop) discloses a tooth color measuring device including: a lighting unit including a housing having an appropriate shape, and installed with lamps of three colors (red, blue and green) in the housing to transfer the color generated by each color lamp to a predetermined distance; a focusing optical system for forming a focus for a light source provided by the lighting unit and reflected on the tooth surface; a sensor unit for separating the color of the light source introduced through the focusing optical system, and converting and outputting each separated color signal into a digitized signal of a predetermined level; a signal processing unit that analyzes the color of teeth based on the detection result of the sensor unit to extract the closest color of pre-stored color information of dentures based on the analysis result, detects luminance information about the light source from the sensor unit, and then controls the focus of the focusing optical system based on the luminance information; and a display unit for displaying the tooth color analysis result of the signal processing unit.

DISCLOSURE

Technical Problem

One technical problem to be solved by the present invention is to provide an artificial tooth manufacturing information generation method and an artificial tooth manufacturing system to minimize the subjective determination of a user manufacturing an artificial tooth, thereby manufacturing the artificial tooth having minimal differences in color and shape of an original tooth regardless of the experience and career of the user manufacturing the artificial tooth.

Another technical problem to be solved by the present invention is to provide an artificial tooth manufacturing information generation method and an artificial tooth manufacturing system, so as to be used in a simple manner.

Still another technical problem to be solved by the present invention is to provide an artificial tooth manufacturing information generation method and an artificial tooth manufacturing system, so as to be used at a low cost.

Still another technical problem to be solved by the present invention is to provide an artificial tooth manufacturing information generation method and an artificial tooth manufacturing system, so as to have improved reliability.

The technical problem to be solved by the present invention is not limited to the above technical problems.

Technical Solution

In order to solve the above technical problems, the present invention provides an artificial tooth manufacturing information generation method.

According to one embodiment, the artificial tooth manufacturing information generation method includes the steps of: photographing a target tooth to acquire a primary image; correcting the primary image to acquire a secondary image; selecting an area including the target tooth from the secondary image to extract a tertiary image; selecting a noise area caused by reflected light from the tertiary image and then correcting the noise area, to acquire a quaternary image; and generating artificial tooth manufacturing information by using a pixel value of the target tooth included in the quaternary image.

According to one embodiment, the acquiring of the primary image may include acquiring a color patch image by photographing a color patch together with the target tooth, and the acquiring of the secondary image may include calculating a correction constant for minimizing a difference between a pixel value of the color patch image acquired through the photographing and a unique pixel value of the color patch; and acquiring the secondary image from the primary image by using the correction constant.

According to one embodiment, the color patch may include a plurality of color blocks arranged separately from each other, and the artificial tooth manufacturing information may include a mixing ratio of the color blocks matching the pixel values of the target tooth included in the quaternary image.

According to one embodiment, the generating of the artificial tooth manufacturing information may include: dividing the target tooth included in the quaternary image into a plurality of sub-areas; generating a standard pixel value of each of the sub-areas; and generating a mixing ratio of the color blocks matching the standard pixel values for each of the sub-areas.

According to one embodiment, the dividing of the target tooth included in the quaternary image into the sub-areas may include setting pixels, which have pixel values of the target tooth within a reference range in the quaternary image, as same sub-areas.

According to one embodiment, the primary image may be acquired by photographing the target tooth using a camera included in the terminal, such that at least one area of a grid displayed on a screen of a terminal overlaps with at least one area of the target tooth.

According to one embodiment, the tertiary image may be extracted by selecting an area including the target tooth from the secondary image through a region proposal convolutional neural network (R-CNN) algorithm.

According to one embodiment, the tertiary image may be extracted by converting RGB values of the secondary image into HSV values, and then selecting an area including the target tooth from the converted secondary image.

According to one embodiment, the tertiary image may be extracted by converting the secondary image to gray scale, and then selecting an area including the target tooth from the converted secondary image.

According to one embodiment, in the acquiring of the quaternary image, the noise area may be corrected using a histogram of the tertiary image.

According to one embodiment, the quaternary image may be acquired by comparing the tertiary images extracted from the primary images photographed at different angles, selecting the noise area through reflected light generated at different positions, and correcting the noise area.

In order to solve the above technical problems, the present invention provides an artificial tooth manufacturing system.

According to one embodiment, the artificial tooth manufacturing system includes: a photographing unit for photographing a target tooth to acquire a primary image; a pixel value correction unit for correcting the primary image to acquire a secondary image; a target tooth extraction unit for selecting an area including the target tooth from the secondary image to extract a tertiary image; a reflected light removal unit for selecting a noise area caused by reflected light from the tertiary image and then correcting the noise area, to acquire a quaternary image; and an artificial tooth manufacturing information generation unit for generating artificial tooth manufacturing information by using a pixel value of the target tooth included in the quaternary image.

According to one embodiment, the photographing unit may further acquire a color patch image by photographing a color patch together with the target tooth, and the pixel value correction unit may calculate a correction constant for minimizing a difference between a pixel value of the color patch image and a unique pixel value of the color patch, and acquire the secondary image from the primary image by using the correction constant.

According to one embodiment, the color patch may include a plurality of color blocks arranged separately from each other, and the artificial tooth manufacturing information generation unit may generate a mixing ratio of the color blocks matching a pixel value of the target tooth included in the quaternary image.

Advantageous Effects

The artificial tooth manufacturing information generation method according to the embodiments of the present invention includes the steps of: photographing a target tooth to acquire a primary image; correcting the primary image to acquire a secondary image; selecting an area including the target tooth from the secondary image to extract a tertiary image; selecting a noise area caused by reflected light from the tertiary image and then correcting the noise area, to acquire a quaternary image; and generating artificial tooth manufacturing information by using a pixel value of the target tooth included in the quaternary image.

In addition, the acquiring of the primary image may include acquiring a color patch image by photographing a color patch together with the target tooth, and the acquiring of the secondary image may include calculating a correction constant for minimizing a difference between a pixel value of the color patch image acquired through the photographing and a unique pixel value of the color patch; and acquiring the secondary image from the primary image by using the correction constant.

In addition, the color patch may include a plurality of color blocks arranged separately from each other, and the artificial tooth manufacturing information may include a mixing ratio of the color blocks matching the pixel values of the target tooth included in the quaternary image.

Accordingly, when an artificial tooth is manufactured through the artificial tooth manufacturing information, the subjective determination of a user who manufactures the artificial tooth (for example, the confirmation using the user's eyes) is minimized, so that an artificial tooth with a minimized difference in color, shape, and transparency of an original tooth can be manufactured regardless of the experience and career of the user who manufactures the artificial tooth.

In addition, since the artificial tooth manufacturing information may be easily generated using a generalized smartphone, the method according to the present invention can be easily used by anyone, and can be used at a significantly lower cost compared to the existing tooth color discrimination apparatus.

DESCRIPTION OF DRAWINGS

FIG. 1 is a flowchart for explaining an artificial tooth manufacturing information generation method according to the embodiments of the present invention.

FIGS. 2 and 3 are views showing a method of acquiring a primary image according to the embodiments of the present invention.

FIG. 4 is a view showing a color patch according to the embodiments of the present invention.

FIG. 5 is a view showing a color patch image according to the embodiments of the present invention.

FIG. 6 is a view showing a method of acquiring a secondary image according to the embodiments of the present invention.

FIG. 7 is a view showing a method of acquiring a tertiary image according to the embodiments of the present invention.

FIG. 8 is a view showing a method of acquiring a quaternary image according to the embodiments of the present invention.

FIG. 9 is a view showing pixel values of a target tooth included in the quaternary image according to the embodiments of the present invention.

FIG. 10 is a diagram showing artificial tooth manufacturing information generated using the pixel values of the target tooth included in the quaternary image according to the embodiments of the present invention.

FIGS. 11 and 12 are diagrams showing that the target tooth included in the quaternary image is divided into a plurality of sub-areas according to the embodiments of the present invention.

FIG. 13 is a diagram showing artificial tooth manufacturing information for each of the sub-areas according to the embodiments of the present invention.

FIG. 14 is a photograph of the color patch used in an artificial tooth manufacturing information generation method and an artificial tooth manufacturing system according to the embodiments of the present invention.

FIG. 15 shows diagrams illustrating color patch images photographed by different cameras according to the embodiments of the present invention.

FIG. 16 shows diagrams illustrating images corrected by applying correction constants to the color patch images photographed in FIG. 15.

FIG. 17 shows diagrams illustrating tooth images to which the correction constants are applied according to the embodiments of the present invention.

FIG. 18 shows pictures acquired by extracting specific areas of teeth through an R-CNN algorithm according to the embodiments of the present invention.

FIGS. 19 and 20 are diagrams showing a method of extracting a specific area of a tooth by converting RGB values of a tooth image into HSV values according to the embodiments of the present invention.

FIGS. 21 and 22 are diagrams for explaining a process of using a histogram to remove reflected light appearing on a tooth image according to the embodiments of the present invention.

FIGS. 23 to 25 are diagrams showing tooth images from which the reflected light has been removed using the histogram according to the embodiments of the present invention.

BEST MODE

Mode for Invention

Hereinafter, exemplary embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

In the specification herein, when one component is mentioned as being on another component, it signifies that the one component may be placed directly on the another component or a third component may be interposed therebetween. In addition, in drawings, thicknesses of layers and areas may be exaggerated to effectively describe the technology of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

FIG. 1 is a flowchart for describing an artificial tooth manufacturing information generation method according to the embodiments of the present invention. FIGS. 2 and 3 are views showing a method of acquiring a primary image according to the embodiments of the present invention. FIG. 4 is a view showing a color patch according to the embodiments of the present invention. FIG. 5 is a view showing a color patch image according to the embodiments of the present invention. FIG. 6 is a view showing a method of acquiring a secondary image according to the embodiments of the present invention. FIG. 7 is a view showing a method of acquiring a tertiary image according to the embodiments of the present invention. FIG. 8 is a view showing a method of acquiring a quaternary image according to the embodiments of the present invention.

Referring to FIG. 1, the artificial tooth manufacturing information generation method according to the embodiments of the present invention includes the steps of: photographing a target tooth to acquire a primary image (S100); correcting the primary image to acquire a secondary image (S200); selecting an area including the target tooth from the secondary image to extract a tertiary image (S300); selecting a noise area caused by reflected light from the tertiary image and then correcting the noise area, to acquire a quaternary image (S400); and generating artificial tooth manufacturing information by using a pixel value of the target tooth included in the quaternary image (S500). Hereinafter, each step will be described in detail.

Primary Image Acquisition Step (S100)

Referring to FIGS. 2 and 3, a primary image $IM_1$ may be acquired by photographing a target tooth through a terminal having a screen on which a grid G is displayed. In other words, the primary image $IM_1$ may be an image acquired by photographing the target tooth. For example, the terminal may be a smartphone. More specifically, the target tooth may be photographed while the grid G is displayed on the screen through the application of the smartphone. for another example, the terminal may be a smart camera, a computer, or the like. The type of the terminal is not limited.

According to one embodiment, the target tooth may be photographed so that at least one area of the grid G overlap with at least one area of the target tooth. For example, as shown in FIGS. 2 and 3, the grid G may be displayed as a shape of two front teeth. In this case, the target tooth may be photographed so that the grid G overlaps with the two front teeth including the target tooth. On the contrary, for another example, the grid G may be displayed as a shape of entire upper teeth. In this case, the target tooth may be photographed so that the grid G overlap with the entire upper jaw of the target tooth. The shape of the grid G is not limited.

As described above, when the target tooth is photographed through the terminal on which the grid G is displayed on the screen, the target tooth may be photographed at a predetermined distance. Accordingly, the standardized primary image may be acquired regardless of a terminal type, a photographer, a photographing environment, and the like. In the specification herein, the expression "the standardized primary image may be acquired" may be used as a meaning of 'the size of the target tooth shown in the photographed primary images and the amount and position of reflected light appearing on the target tooth may be acquired substantially equivalently even when the same target tooth is photographed by different terminals, different photographers, different photographing environments, and the like'.

On the contrary, when the target tooth is photographed while the grid G is not displayed on the screen, the distance between the terminal and the target tooth may vary. Accordingly, when the terminal type, photographer, photographing environment, and the like vary, the size of the target tooth, the amount and position of reflected light appearing on the target tooth, and the like may vary. Due to this, an error may occur in the artificial tooth manufacturing information described later, and accordingly, the reliability on the artificial tooth manufacturing information may be lowered.

In addition, according to one embodiment, a tooth may be photographed together with a color patch CP as shown in FIG. 2. An achromatic background plate may be used as a background of the color patch CP and the tooth. In other words, the tooth and the color patch CP may be simultaneously photographed so that the achromatic background plate serves as a background. A color patch image CPI acquired by photographing the color patch CP will be described below with reference to FIGS. 4 and 5.

Referring to FIGS. 4 and 5, not only the primary image $IM_1$ but also the color patch image CPI may be further acquired through the terminal. The color patch image CPI may be an image acquired by photographing the color patch CP.

According to one embodiment, the color patch CP may include a plurality of color blocks arranged separately from each other. For example, as shown in FIG. 4, the color patch CP may include first to ninth color blocks $CB_1$ to $CB_9$. For example, the first to ninth color blocks $CB_1$ to $CB_9$ as materials used for manufacturing artificial teeth may have different colors and transparency. On the contrary, for another example, the color patch CP may include a larger number of color blocks or a smaller number of color blocks than the color blocks described above. In other words, the number of color blocks included in the color patch CP is not limited.

As described above the color patch CP includes the first to ninth color blocks $CB_1$ to $CB_9$, so that first to ninth color block images $CBI_1$ to $CBI_9$ corresponding to the first to ninth color blocks $CB_1$ to $CB_9$ may appear, respectively, in the color patch image CPI acquired by photographing the color patch CP.

Secondary Image Acquisition Step (S200)

Referring to FIG. 6, the primary image $IM_1$ may be corrected to obtain a secondary image $IM_2$. More specifically, the secondary image $IM_2$ may be acquired by applying a correction constant to the primary image $IM_1$.

According to one embodiment, the correction constant may be a constant for minimizing a difference between a pixel value (for example, rgb value) of the color patch image CPI and a unique pixel value (for example, rgb value) of the color patch CP. In other words, when the correction constant is applied to the pixel value of the color patch image CPI, the pixel value of the color patch image CPI may substantially match the pixel value of the color patch CP.

Accordingly, the secondary image $IM_2$ acquired by applying the correction constant to the primary image $IM_1$, may have a pixel value after the pixel value of the primary image $IM_1$ is corrected.

For example, the correction constant may be calculated through the following <Equation 1> to <Equation 4>.

$$\begin{bmatrix} r_0 & g_0 & b_0 & 1 \\ r_1 & g_1 & b_1 & 1 \\ . & . & . & . \\ . & . & . & . \\ r_8 & g_8 & b_8 & 1 \end{bmatrix} * M = \begin{bmatrix} r'_0 & g'_0 & b'_0 \\ r'_1 & g'_1 & b'_1 \\ . & . & . \\ . & . & . \\ r'_8 & g'_8 & b'_8 \end{bmatrix}$$ (Equation 1)

(r0 g0 b0~r8 g8 b8: pixel values of the first to ninth color blocks in the color patch image, r'0 g'0 b'0~r'8 g'8 b'8: unique pixel values of the first to ninth color block images, and M: correction constant)

$$T * M = S$$ (Equation 2)

$$T = \begin{bmatrix} r_0 & g_0 & b_0 & 1 \\ r_1 & g_1 & b_1 & 1 \\ . & . & . & . \\ . & . & . & . \\ r_8 & g_8 & b_8 & 1 \end{bmatrix}$$

$$S = \begin{bmatrix} r'_0 & g'_0 & b'_0 \\ r'_1 & g'_1 & b'_1 \\ . & . & . \\ . & . & . \\ r'_8 & g'_8 & b'_8 \end{bmatrix}$$

$$(T' * T) * M = T' * S$$ (Equation 3)

(Tt: inverse matrix of T)

$$M = (T'*T)^{-1} * T' * S$$ <Equation 4>

As a result, the secondary image $IM_2$ may have pixel values standardized by the correction constant. In this specification, the expression 'the image has a standardized pixel value' may be used as a meaning of 'pixel values of a plurality of photographed images are substantially constant even when the same target tooth is photographed by different terminals, different photographing environments, and the like'. Accordingly, the reliability on the artificial tooth manufacturing information described later may be improved.

Unlike the above description, when the primary image $IM_1$ is not corrected through the correction constant, pixel values of the primary image $IM_1$ may be different from each other due to the terminal type, photographing environment, and the like. Accordingly, when the artificial tooth manufacturing information described later is acquired through the uncorrected first image $IM_1$, an error may occur in the artificial tooth manufacturing information described later, and accordingly, the reliability on the artificial tooth manufacturing information may be lowered.

Tertiary Image Acquisition Step (S300)

Referring to FIG. 7, an area including the target tooth may be selected from the secondary image $IM_2$ to extract a tertiary image $IM_3$. According to one embodiment, the area including the target tooth may be an area for a single tooth in the secondary image $IM_2$. Accordingly, the tertiary image $IM_3$ may indicate an image of the single tooth. For example, as shown in FIG. 7, an image of one front tooth may be extracted from the secondary image $IM_2$. Accordingly, the tertiary image $IM_3$ may indicate an image of one front tooth. In other words, a specific tooth (for example, one front tooth) may be extracted from the secondary image $IM_2$ in which a plurality of teeth and gums are shown together, so that the tertiary image $IM_3$ may be acquired.

According to one embodiment, the tertiary image $IM_3$ may be extracted by selecting an area including the target tooth from the secondary image $IM_2$ through a deep learning scheme. For example, the deep learning scheme may include a region proposal convolutional neural network (R-CNN) algorithm. The R-CNN algorithm trains and recognizes while focusing regions based on the existing CNN algorithm, and has an improved object recognition rate compared to the existing deep learning schemes, so that extraction accuracy for a specific tooth may be improved.

On the contrary, according to another embodiment, the tertiary image $IM_3$ may be extracted by converting RGB values of the secondary image $IM_2$ into HSV values, and then selecting an area including the target tooth from the converted secondary image. More specifically, RGB values of the secondary image may be converted into HSV values to find a range of values occupied by the area to be extracted, and the area to be extracted may be separated from a peripheral area, so that the tertiary image $IM_3$ may be extracted. When the RGB values are converted into the HSV values, brightness, saturation, and hue are displayed on one axis, so that a specific area can be easily extracted.

On the contrary, according to another embodiment, the tertiary image $IM_3$ may be extracted by converting the secondary image into gray scale, and then selecting the area including the target tooth from the converted secondary image $IM_2$. In the secondary image $IM_2$ converted to the gray scale, white areas may be emphasized and red areas may be ignored, so that teeth may be efficiently distinguished from gums.

Quaternary Image Acquisition Step (S300)

Referring to FIG. 8, a quaternary image $IM_4$ may be acquired by selecting a noise area due to the reflected light RL in the tertiary image $IM_3$ and correcting the noise area. In other words, the quaternary image $IM_4$ may be an image acquired by removing the reflected light RL from the tertiary image $IM_3$.

According to one embodiment, the noise area may be corrected using a histogram of the tertiary image $IM_3$. More specifically, a white peak value may be found from distribution values of the histogram of the tertiary image $IM_3$, and then a color gamut on the right side of the white peak value may be removed, so that the noise area may be corrected.

On the contrary, according to another embodiment, the reflected light RL generated at different positions among the tertiary images $IM_3$ photographed at different angles may be compared, so that the noise area may be corrected. More specifically, the noise area may be corrected by obtaining color information on the area covered by the reflected light RL in the tertiary image $IM_3$ extracted from a plurality of primary images photographed at different positions in which the reflected light RL is generated.

Artificial Tooth Manufacturing Information Generation Step (S500)

FIG. 9 is a view showing pixel values of a target tooth included in the quaternary image according to the embodiments of the present invention. FIG. 10 is a diagram showing artificial tooth manufacturing information generated using the pixel values of the target tooth included in the quaternary image according to the embodiments of the present invention. FIGS. 11 and 12 are views showing that the target tooth included in the quaternary image is divided into a plurality of sub-areas according to the embodiments of the present invention. FIG. 13 is a diagram showing artificial tooth manufacturing information for each of the sub-areas according to the embodiments of the present invention.

Referring to FIGS. 9 and 10, artificial tooth manufacturing information may be generated by using pixel values of the target tooth included in the quaternary image $IM_4$. According to one embodiment, the artificial tooth manufacturing information may include a mixing ratio of the color blocks $CB_1$ to $CB_9$ matching the pixel values of the target tooth included in the quaternary image $IM_4$.

More specifically, when the color blocks $CB_1$ to $CB_9$ included in the color patch CP are mixed with each other, a specific pixel value may be generated. Accordingly, the pixel value of the target tooth included in the quaternary image $IM_4$ may be implemented through the mixing ratio of the color blocks $CB_1$ to $CB_9$.

For example, as shown in FIG. 10, an $R_1G_1B_1$ pixel value of the quaternary image $IM_4$ may be implemented by mixing 10% of the first color block $CB_1$, 8% of the second color block $CB_2$, 3% of the third color block $CB_3$, 12% of the fourth color block $CB_4$, 2% of the fifth color block $CB_5$, 20% of the sixth color block $CB_6$, 15% of the seventh color block $CB_7$, 17% of the eighth color block $CB_8$, and 13% of the ninth color block $CB_9$.

On the contrary, an $R_2G_2B_2$ pixel value of the quaternary image $IM_4$ may be implemented by mixing 8% of the first color block $CB_1$, 12% of the second color block $CB_2$, 10% of the third color block $CB_3$, 3% of the fourth color block $CB_4$, 17% of the fifth color block $CB_5$, 13% of the sixth color block $CB_6$, 2% of the seventh color block $CB_7$, 20% of the eighth color block $CB_8$, and 5% of the ninth color block $CB_9$. The above-described mixing ratios of the color blocks $CB_1$ to $CB_9$ are exemplary, and the mixing ratio of the color blocks $CB_1$ to $CB_9$ for implementing a pixel value may be different from the above.

As a result, the artificial tooth manufacturing information may be generated for each pixel value of the target tooth included in the quaternary image $IM_4$. However, when the artificial tooth manufacturing information is generated for each pixel value of the target tooth as described above, data overload may occur, and it may be significantly difficult to manufacture artificial teeth using the above information. Accordingly, the target tooth included in the quaternary image $IM_4$ may be divided into specific areas, and the artificial tooth manufacturing information may be generated for the divided area.

Referring to FIGS. 11 to 13, the target tooth included in the quaternary image $IM_4$ may be divided into a plurality of sub-areas. For example, as shown in FIGS. 11 and 12, the target tooth included in the quaternary image $IM_4$ may be divided into first to sixth sub-areas SA1 to SA6. The number of the sub-areas is exemplary, and may be divided more or less than the above-described first to sixth sub-areas SA1 to SA6.

According to one embodiment, as shown in FIG. 11, pixels having pixel values of the target tooth within a reference range in the quaternary image $IM_4$ may be set as the same sub-area. In other words, the areas having similar pixel values in the target tooth may be set as the same sub-area. For example, pixels having pixel values of the target tooth within a first reference range may be set as a first sub-area SA1, pixels having pixel values of the target tooth within a second reference range may be set as a second sub-area SA2, pixels having pixel values of the target tooth within a third reference range may be set as a third sub-area SA3, pixels having pixel values of the target tooth within a fourth reference range may be set as a fourth sub-area SA4, pixels having pixel values of the target tooth within a fifth reference range may be set as a fifth sub-area SA5, and pixels having pixel values of the target tooth within a sixth reference range may be set as a sixth sub-area SA6. On the contrary, according to another embodiment, as shown in FIG. 12, the target tooth may be divided into predetermined arbitrary areas in the quaternary image $IM_4$. The method for dividing the sub-areas is not limited.

After the sub-areas are divided, each standard pixel value of the sub-areas may be generated. According to one embodiment, the standard pixel value may be an average value of pixel values included in the sub-area.

Referring to FIG. 13, the artificial tooth manufacturing information may be generated for each of the sub-areas. In other words, a mixing ratio of the color blocks $CB_1$ to $CB_9$ matching the standard pixel values of the sub-areas may be generated.

The artificial tooth manufacturing information may be provided to users (for example, dental technicians) who manufacture artificial teeth. The users may manufacture artificial teeth based on the artificial tooth manufacturing information. More specifically, the users may determine colors of the artificial tooth based on the artificial tooth manufacturing information. Accordingly, the artificial tooth manufactured based on the artificial tooth manufacturing information may have a constant color and transparency regardless of the experience and career of the user who manufactures the artificial tooth.

Unlike the above description, the existing artificial teeth have been subject to colors of the artificial teeth through the subjective determination of the user who manufactures the artificial teeth (for example, the confirmation using the user's eyes). Accordingly, a color mismatch occurs. In order to solve the above problem, equipment for distinguishing a tooth color has been developed to prevent the intervention by the subjective determination of the user who manufactures the artificial tooth. However, the existing equipment for distinguishing a tooth color has complex configurations, and is sold at a high price, and accordingly, it is not easy to substantially apply the equipment.

However, the artificial tooth manufacturing information generation method according to the embodiments of the present invention includes: photographing a target tooth to acquire the primary image $IM_1$; correcting the primary image $IM_1$ to acquire the secondary image $IM_2$; selecting an area including the target tooth from the secondary image $IM_2$ to extract the tertiary image selecting a noise area caused by reflected light from the tertiary image $IM_3$ and then correcting the noise area, to acquire the quaternary image $IM_4$; and generating artificial tooth manufacturing information by using a pixel value of the target tooth included in the quaternary image $IM_4$.

In addition, the acquiring of the primary image $IM_1$ may include acquiring a color patch image CPI by photographing the color patch CP together with the target tooth, and the acquiring of the secondary image $IM_2$ may include calculating a correction constant for minimizing a difference between a pixel value of the color patch image CPI acquired through the photographing and a unique pixel value of the color patch CP; and acquiring the secondary image $IM_2$ from the primary image $IM_1$ by using the correction constant.

In addition, the color patch CP may include a plurality of color blocks $CB_1$ to $CB_9$ arranged separately from each other, and the artificial tooth manufacturing information may include a mixing ratio of the color blocks $CB_1$ to $CB_9$ matching the pixel values of the target tooth included in the quaternary image $IM_4$.

Accordingly, when an artificial tooth is manufactured through the artificial tooth manufacturing information, the subjective determination of a user who manufactures the artificial tooth (for example, the confirmation using the user's eyes) is minimized, so that an artificial tooth with a minimized difference in color, shape, and transparency of an original tooth can be manufactured regardless of the experience and career of the user who manufactures the artificial tooth.

In addition, since the artificial tooth manufacturing information may be easily generated using a generalized smartphone, the method according to the present invention can be easily used by anyone, and can be used at a significantly lower cost compared to the existing tooth color discrimination apparatus.

The artificial tooth manufacturing information generation method according to the embodiments of the present invention has been described. Hereinafter, the artificial tooth manufacturing system according to the embodiments of the present invention will be described.

The artificial tooth manufacturing system according to the embodiments of the present invention may include a photographing unit, a pixel value correction unit, a target tooth extraction unit, a reflected light removal unit, and an artificial tooth manufacturing information generation unit. Hereinafter, each component will be described.

The photographing unit may photograph a target tooth to acquire a primary image. According to one embodiment, the primary image may be acquired by photographing the target tooth through a terminal in which a grid is displayed on a screen. More specifically, the target tooth may be photographed, such that at least one area of the grid overlaps with at least one area of the target tooth.

In addition, the photographing unit may photograph a color patch to acquire a color patch image. According to one embodiment, the color patch may include a plurality of color blocks arranged separately from each other. For example, the color patch may include first to ninth color blocks. The first to ninth color blocks as materials used for manufacturing artificial teeth may have different colors. On the contrary, for another example, the color patch may include a larger number of color blocks or a smaller number of color blocks than the color blocks described above. In other words, the number of color blocks included in the color patch is not limited. When the color patch includes first to ninth color blocks, first to ninth color block images corresponding to the first to ninth color blocks may be displayed, respectively, in the color patch image.

The pixel value correction unit may correct the primary image to acquire a secondary image. In addition, the pixel value correction unit may calculate a correction constant for minimizing a difference between a pixel value of the color patch image and a unique pixel value of the color patch. The method of calculating the correction constant may be the same as the method of calculating the correction constant in the secondary image acquisition step as described with reference to FIG. 6. Accordingly, a detailed description will be omitted.

The correction constant may be applied to correct the primary image. In other words, the secondary image may be acquired by applying a correction constant to the primary image. As a result, the secondary image may have pixel values standardized by the correction constant. Accordingly, the reliability on the artificial tooth manufacturing information described later may be improved.

The target tooth extraction unit may select an area including the target tooth from the secondary image to extract a tertiary image. According to one embodiment, the area including the target tooth may be an area for a single tooth in the secondary image. Accordingly, the tertiary image may indicate an image of the single tooth.

According to one embodiment, the tertiary image may be extracted by selecting an area including the target tooth from the secondary image $IM_2$ through a deep learning scheme. On the contrary, according to another embodiment, the tertiary image may be extracted by converting RGB values of the secondary image $IM_2$ into HSV values, and then selecting an area including the target tooth from the converted secondary image. On the contrary, according to another embodiment, the tertiary image $IM_3$ may be extracted by converting the secondary image into gray scale, and then selecting the area including the target tooth from the converted secondary image $IM_2$.

The reflected light removal unit may select a noise area caused by reflected light from the tertiary image and then correct the noise area, to acquire a quaternary image. In other words, the quaternary image may be an image acquired by removing the reflected light from the tertiary image.

According to one embodiment, the noise area may be corrected using a histogram of the tertiary image. On the contrary, according to another embodiment, the noise region may be corrected by comparing the reflected light generated at different positions among the tertiary images photographed at different angles.

The artificial tooth manufacturing information generation unit may generate artificial tooth manufacturing information by using a pixel value of the target tooth included in the quaternary image. According to one embodiment, the artificial tooth manufacturing information may include a mixing ratio of the color blocks matching the pixel values of the target tooth included in the quaternary image.

More specifically, when the color blocks included in the color patch are mixed with each other, a specific pixel value may be generated. Accordingly, the pixel value of the target tooth included in the quaternary image may be implemented through a mixing ratio of the color blocks. As a result, the artificial tooth manufacturing information may be generated for each pixel value of the target tooth included in the quaternary image. However, since data overload may occur when the artificial tooth manufacturing information is generated for each pixel value of the target tooth, the target tooth included in the quaternary image may be divided into specific areas, and the artificial tooth manufacturing information may be generated for the divided area.

According to one embodiment, pixels having pixel values of the target tooth within a reference range in the quaternary image may be set as the same sub-area. For example, pixels having pixel values of the target tooth within a first reference range may be set as a first sub-area, and pixels having pixel values of the target tooth within a second reference range may be set as a second sub-area. On the contrary, according to another embodiment, the target tooth may be divided into predetermined areas in the quaternary image.

After the sub-areas are divided, each standard pixel value of the sub-areas may be generated. According to one embodiment, the standard pixel value may be an average value of pixel values included in the sub-area.

The artificial tooth manufacturing information may be generated for each of the sub-areas. In other words, a mixing ratio of the color blocks matching the standard pixel values of the sub-areas may be generated. Accordingly, the above-mentioned data overload problem may be solved.

As a result, the artificial tooth manufacturing system according to the embodiments of the present invention may include: the photographing unit for photographing the target tooth to acquire the primary image; the pixel value correction unit for correcting the primary image to acquire the secondary image; the target tooth extraction unit for selecting an area including the target tooth from the secondary image to extract the tertiary image; a reflected light removal unit for selecting a noise area caused by reflected light from the tertiary image and then correcting the noise area, to acquire the quaternary image; and the artificial tooth manufacturing information generation unit for generating the artificial tooth manufacturing information by using a pixel value of the target tooth included in the quaternary image.

In addition, the photographing unit may further acquire a color patch image by photographing a color patch together with the target tooth, and the pixel value correction unit may calculate a correction constant for minimizing a difference between a pixel value of the color patch image and a unique pixel value of the color patch, and acquire the secondary image from the primary image by using the correction constant.

In addition, the color patch may include a plurality of color blocks arranged separately from each other, and the artificial tooth manufacturing information generation unit may generate a mixing ratio of the color blocks matching a pixel value of the target tooth included in the quaternary image.

Accordingly, when an artificial tooth is manufactured through the artificial tooth manufacturing information, the subjective determination of a user who manufactures the artificial tooth (for example, the confirmation using the user's eyes) is minimized, so that an artificial tooth with a minimized difference in color, shape, and transparency of an original tooth can be manufactured regardless of the experience and career of the user who manufactures the artificial tooth.

The artificial tooth manufacturing system according to the embodiments of the present invention has been described. Hereinafter, specific experimental examples of the artificial tooth manufacturing information generation method and the artificial tooth manufacturing system according to the embodiments of the present invention will be described.

FIG. 14 is a photograph of the color patch used in the artificial tooth manufacturing information generation method and the artificial tooth manufacturing system according to the embodiments of the present invention.

FIG. 14 photographs and shows a color patch used in the artificial tooth manufacturing information generation method and the artificial tooth manufacturing system according to the embodiments of the present invention. As shown in FIG. 14, it is confirmed that the color patch used in the artificial tooth manufacturing information generation method and the artificial tooth manufacturing system includes a plurality of color blocks arranged separately from each other, and the color blocks represent colors different from each other.

FIG. 15 shows diagrams illustrating color patch images photographed by different cameras according to the embodiments of the present invention. FIG. 16 shows diagrams illustrating images corrected by applying correction constants to the color patch images photographed in FIG. 15.

FIG. 15(*a*) shows the color patch of FIG. 14 photographed using a smartphone (Galaxy) made by Samsung company, and FIG. 15(*b*) shows the color patch of FIG. 14 photographed using a smartphone (iPhone) made by Apple company. As shown in FIGS. 15(*a*) and 15(*b*), it is confirmed that the color of the photographed image may be expressed differently depending on the type of smartphone even when the same color patch is used. In other words, it can be seen that the pixel value of the photographed image is different depending on the type of smartphone.

Referring to FIG. 16(*a*), the image photographed in FIG. 15(*a*) is corrected by applying the correction constant thereto, and referring to FIG. 16(*b*), the image photographed in FIG. 15(*b*) is corrected by applying the correction constant thereto. As shown in FIGS. 16(*a*) and 16(*b*), it is confirmed that the photographed images express colors similar to each other when being corrected through the correction constant. In other words, it can be seen that, when the image is corrected through the correction constant described in the artificial tooth manufacturing information generation method and the artificial tooth manufacturing system according to the embodiments of the present invention, the corrected image has a standardized pixel value.

FIG. 17 shows diagrams illustrating tooth images to which the correction constants are applied according to the embodiments of the present invention.

FIG. 17(a) shows teeth photographed using the smartphone (iPhone). Referring to FIG. 17(b), the photographed image in FIG. 17 is corrected by applying the correction constant thereto. As shown in FIGS. 17(a) and 17(b), it is confirmed that the colors of the teeth are corrected when the correction constant is applied to the tooth images. More specifically, the corrected tooth image is corrected in RGB values, white balance and the like.

FIG. 18 show pictures acquired by extracting specific areas of teeth through an R-CNN algorithm according to the embodiments of the present invention.

Referring to FIG. 18, teeth in different positions are photographed and then the R-CNN algorithm is applied to each tooth, thereby extracting only the specific tooth to be extracted. As shown in FIG. 18, it is confirmed that, when the R-CNN algorithm is applied, images only for the specific teeth are extracted while excluding parts other than the specific teeth (such as gums and surrounding teeth).

FIGS. 19 and 20 are diagrams showing a method of extracting a specific area of a tooth by converting RGB values of a tooth image into HSV values according to the embodiments of the present invention.

Referring to FIGS. 19 and 20, a teeth image is photographed and RGB values of the photographed teeth image are converted into HSV values, thereby extracting a specific tooth. More specifically, referring to FIGS. 19(a) and 19(b), a range of values occupied by a specific tooth portion is found by converting RGB values into HSV values. Referring to FIGS. 20(a) and 20(b), the specific tooth is extracted by distinguishing the peripheral area from the specific tooth area to be extracted from the teeth image by using the HSV values. As shown in FIGS. 19 and 20, it can be seen that, the RGB values of the teeth image is converted into the HSV values, and thus the image of the specific tooth is extracted.

FIGS. 21 and 22 are diagrams for explaining a process of using a histogram to remove reflected light appearing on a tooth image according to the embodiments of the present invention. FIGS. 23 to 25 are views showing tooth images from which the reflected light has been removed using the histogram according to the embodiments of the present invention.

Referring to FIGS. 21 and 22, a white peak value is found from distribution values of the histogram of the tooth image, and then a color gamut on the right side of the white peak value is removed. FIG. 21(a) shows an image of a tooth having reflected light, FIG. 21(b) is an image showing a state acquired by removing the color gamut of the right side of the white peak value among the distribution values of the histogram of the tooth image having the reflected light, and FIG. 22 shows a histogram of the tooth image having the reflected light. Thereafter, as shown in FIG. 21(b), the reflected light is removed by filling an empty space (white space) with a surrounding color.

Referring to FIGS. 23 to 25, reflected light is removed with respect to different teeth by using the method described in FIGS. 21 and 22. In each drawings, (a) shows a state before the reflected light is removed, and (b) shows a state after the reflected light is removed. As shown in FIGS. 23 to 25, it can be seen that the reflected light is easily removed using the histogram.

Although the present invention has been described in detail using exemplary embodiments, the scope of the present invention is not limited to the specific embodiments, and shall be interpreted by the appended claims. In addition, it will be apparent that a person having ordinary skill in the art may carry out various deformations and modifications for the embodiments described as above within the scope without departing from the present invention.

INDUSTRIAL APPLICABILITY

The technical idea according to the embodiments of the present application, may be applied to an artificial tooth manufacturing system and an artificial tooth manufacturing method by generating artificial tooth manufacturing information.

The invention claimed is:

1. An artificial tooth manufacturing information generation method comprising:
    photographing, together with a target tooth, a color patch including a plurality of color blocks arranged separately from each other to acquire a primary image;
    correcting the primary image to acquire a secondary image;
    selecting an area including the target tooth from the secondary image to extract a tertiary image;
    selecting a noise area caused by reflected light from the tertiary image and then correcting the noise area, to acquire a quaternary image; and
    generating artificial tooth manufacturing information by using a pixel value of the target tooth included in the quaternary image,
    wherein the artificial tooth manufacturing information includes a mixing ratio of the plurality of color blocks matching the pixel values of the target tooth included in the quaternary image.

2. The artificial tooth manufacturing information generation method of claim 1, wherein the acquiring of the primary image includes: acquiring a color patch image by photographing the color patch together with the target tooth, and the acquiring of the secondary image includes:
    calculating a correction constant for minimizing a difference between a pixel value of the color patch image acquired through the photographing and a unique pixel value of the color patch; and
    acquiring the secondary image from the primary image by using the correction constant.

3. The artificial tooth manufacturing information generation method of claim 1, wherein the generating of the artificial tooth manufacturing information includes:
    dividing the target tooth included in the quaternary image into a plurality of sub-areas;
    generating a standard pixel value of each of the plurality of sub-areas; and
    generating a mixing ratio of the plurality of color blocks matching the standard pixel values for each of the plurality of sub-areas.

4. The artificial tooth manufacturing information generation method of claim 3, wherein the dividing of the target tooth included in the quaternary image into the plurality of sub-areas includes:
    setting pixels, which have pixel values of the target tooth within a reference range in the quaternary image, as same sub-areas.

5. The artificial tooth manufacturing information generation method of claim 1, wherein the primary image is acquired by photographing the target tooth using a camera included in a terminal, such that at least one area of a grid displayed on a screen of a terminal overlaps with at least one area of the target tooth.

6. The artificial tooth manufacturing information generation method of claim 1, wherein the tertiary image is extracted by selecting an area including the target tooth from the secondary image through a region proposal convolutional neural network (R-CNN) algorithm.

7. The artificial tooth manufacturing information generation method of claim 1, wherein the tertiary image is extracted by converting RGB values of the secondary image into HSV values, and then selecting an area including the target tooth from the converted secondary image.

8. The artificial tooth manufacturing information generation method of claim 1, wherein the tertiary image is extracted by converting the secondary image to gray scale, and then selecting an area including the target tooth from the converted secondary image.

9. The artificial tooth manufacturing information generation method of claim 1, wherein the acquiring of the quaternary image includes:
  correcting the noise area by using a histogram of the tertiary image.

10. The artificial tooth manufacturing information generation method of claim 1, wherein the quaternary image is acquired by comparing tertiary images extracted from primary images photographed at different angles, selecting the noise area through reflected light generated at different positions, and correcting the noise area.

* * * * *